W. Rice,
Curtain Fixture.
Nº 26,925. Patented Jan. 24, 1860.
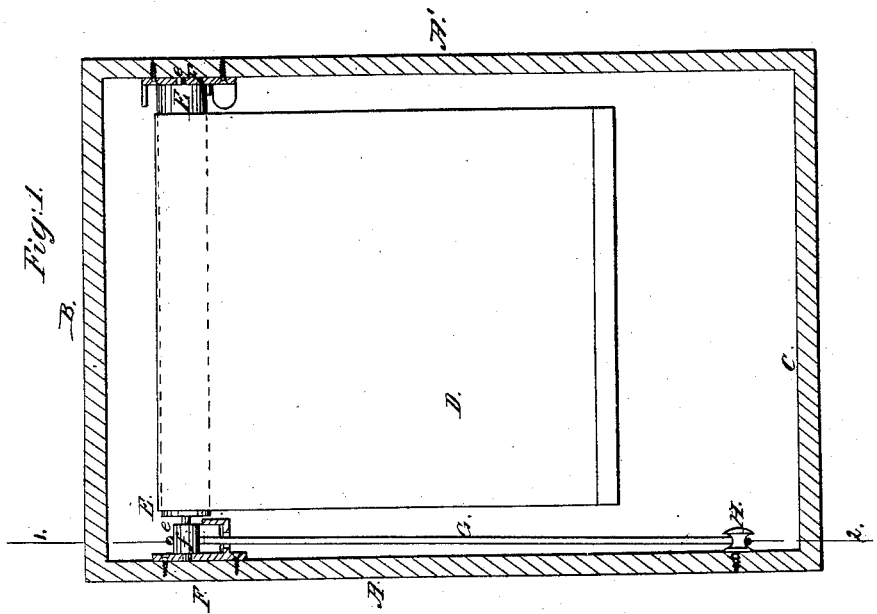
Witnesses:
Henry Howson
Horace See
Inventor:
Wm Rice

UNITED STATES PATENT OFFICE.

WILLIAM RICE, OF PHILADELPHIA, PENNSYLVANIA.

CURTAIN-FIXTURE.

Specification of Letters Patent No. 26,925, dated January 24, 1860.

*To all whom it may concern:*

Be it known that I, WILLIAM RICE, of the city and county of Philadelphia and State of Pennsylvania, have invented a new and useful Improvement in Window-Blind Fixtures, and I do hereby declare the following to be a full, clear, and exact description of the same, reference being had to the accompanying drawing and to the letters of reference marked thereon.

My invention consists in the arrangement described hereafter of a pulley on the blind rollers, two other pulleys, and an endless band, the whole of the pulleys being covered with yielding material, and turning in fixed centers, so as to retain the blind in any position to which it has been raised or lowered, and so that the usual cord tightener may be dispensed with.

In order to enable others to make and use my invention, I will now proceed to describe its construction and operation.

On reference to the accompanying drawing which forms a part of this specification, Figure 1 is a front view of my improved window blind fixtures; Fig. 2, a sectional elevation on the line 1, 2, Fig. 1.

A and A' represent the two jambs, B the top and C the bottom of a plain window frame.

D is the window blind hung to the roller E, the pins $e$ of which turn in brackets F and F' one of which is secured to the inside of each jamb of the window frame. On the pin $e$ which turns in the bracket F is a small pulley $f$ covered with gum elastic, gutta percha, or other equivalent yielding material, and below this pulley are two other pulleys $h$ and $i$ turning on pins on the same bracket, the two lower pulleys being a short distance apart from each other and the upper pulley being situated directly above the space between the two lower pulleys.

G is a cord passing, below, around a pin H, the jamb of the window, and above, through an opening in the bracket F, thence between the two pulleys $h$ and $i$ and around the pulley $f$. The lower pulleys are also covered with gum elastic, or other equivalent yielding material, and are so situated in respect to the upper pulley that the cord which passes freely between the two lower pulleys, passes around the greater portion of the circumference of the upper pulley, to the surface of which the cord is pressed and tightened by the two lower pulleys, thereby creating such a friction in the journals of the whole of the rollers as to retain the blind in any position to which it has been elevated. The friction however is not so great as to prevent the free movement of the blind up or down by pulling the cord, the action of which, whether it be tight or slack will be always the same on the pulley $f$ so that the usual apparatus for tightening the cord at the bottom may be dispensed with and a simple pin H used in its place.

I do not claim broadly the employment of the two pulleys $i$, $i$ for causing the cord to bear against the greater portion of the circumference of the pulley $f$, but

I claim as my invention and desire to secure by Letters Patent—

The arrangement of the pulley $f$ on the blind roller, the pulleys $i$, $i$, and the endless cord G, when the whole of the pulleys turn on fixed centers and when they are covered with gum elastic or other yielding material as and for the purpose herein set forth.

In testimony whereof, I have signed my name to this specification in the presence of two subscribing witnesses.

WM. RICE.

Witnesses:
HENRY HOWSON,
CHARLES D. FREEMAN.